United States Patent [19]

Kurachi et al.

[11] Patent Number: 5,760,413
[45] Date of Patent: Jun. 2, 1998

[54] METHOD AND APPARATUS FOR INSPECTING PIPE THICKNESS

[75] Inventors: Hisashi Kurachi; Hideo Sekido; Masao Sasagawa, all of Yokkaichi, Japan

[73] Assignee: Sumitomo Wiring Systems, Ltd., Japan

[21] Appl. No.: 548,465

[22] Filed: Oct. 26, 1995

[30] Foreign Application Priority Data

Dec. 26, 1994 [JP] Japan .................. 6-322818

[51] Int. Cl.⁶ .................................. G01B 11/06
[52] U.S. Cl. .................. 250/559.28; 250/223 R; 250/224; 356/382; 356/435; 356/239
[58] Field of Search ................... 250/234, 235, 250/236, 573, 574, 575, 576, 223 R, 224, 559.27, 559.28, 338.1, 359.1, 223 B; 356/436, 440, 441, 442, 237, 239, 241, 381, 382, 432, 434, 435

[56] References Cited

U.S. PATENT DOCUMENTS 4,510,389  4/1985  Fumoto ........................ 250/339
4,988,210  1/1991  Koshihara et al. ............ 250/341.6
5,049,750  9/1991  Hoshino et al. ............... 250/341
5,139,406  8/1992  Hoshino et al. ............ 250/223 B
5,185,533  2/1993  Banks et al. .
5,362,962  11/1994 Barborak et al. ............. 250/234

FOREIGN PATENT DOCUMENTS 55-99004   7/1980  Japan .
2032100    4/1980  United Kingdom ............ 356/382

Primary Examiner—Edward P. Westin
Assistant Examiner—John R. Lee
Attorney, Agent, or Firm—Jordan B. Bierman; Bierman, Muserlian and Lucas

[57] ABSTRACT

A plurality of radiation receiving elements disposed outside a pipe at equal distances from the axis thereof so that radiation from a radiation source is received through the pipe wall. As the thickness of the pipe wall varies, the received radiation varies accordingly. If the received radiation fluctuates in excess of the allowable range, the thickness of the pipe wall is judged to be outside the allowable range. When the fluctuation of the received radiation is within the allowable range, the thickness of the pipe wall is within the preset tolerances.

18 Claims, 4 Drawing Sheets

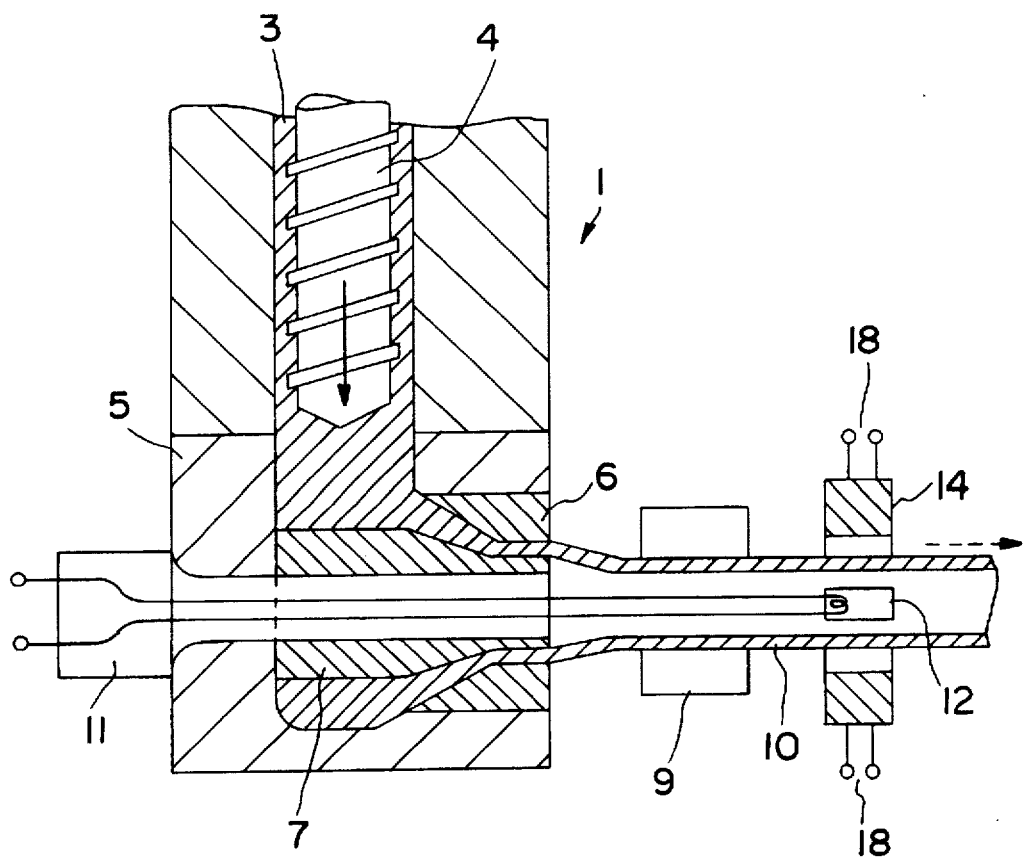
F I G. 1

5,760,413

METHOD AND APPARATUS FOR INSPECTING PIPE THICKNESS

This Application claims the benefit of the priority of Japanese Application 6/322818, filed Dec. 26, 1994.

The present Invention relates to a method and apparatus for inspecting the wall thickness of pipe which is transparent to radiation. While the Invention will be described particularly with respect to extruded pipe which is transparent to visible light, it is understood that it is applicable to pipe generally, regardless of its method of manufacture, so long as the pipe is transparent to the radiation used.

BACKGROUND OF THE INVENTION

Heretofore, as a method for monitoring the wall thickness of a translucent pipe of synthetic resin such as PVC, polyolefin, or polyamide, supersonic inspection or electrostatic capacity inspection are known. In the case of the former, supersonic waves are transmitted from a source thereof to the pipe to be inspected, and the supersonic waves reflected on the outside and inside of the pipe wall are received by a receiving element which detects changes in wall thickness from the fluctuation of the time difference in the receipt of the signal. However, because the efficiency of transmission of the supersonic signal greatly affects the precision of the measurement, it is necessary to take special steps to locate liquids such as water, oil, etc. between the transmission and receiving element of the supersonic waves and the pipe to be inspected. It is also often required to decrease unnecessary reflection of the supersonic waves during the operation, thereby making the mechanism or data processing very complicated.

In the electrostatic capacity method, the measuring electrode is brought into contact with the pipe wall to measure the electrostatic capacity and, based on the variation of the measured value, a determination is made to see whether the wall thickness of the pipe is within allowable tolerances.

In order to improve the precision of measurement, the measuring electrode is required to be large. When the diameter of the pipe to be measured is small, it is practically impossible to arrange a plurality of electrodes in contact with the pipe wall. When there are substances having different dielectric constants, such as water, which adhere to the surface of the pipe to be measured, the measurement error becomes very large. On the other hand, when the diameter of the pipe to be measured is small, the effect of the curvature of the cross section of the pipe wall is a major factor, so that it becomes impossible to measure the local pipe wall thickness. The measured data is averaged and, for the foregoing reasons, contains enhanced errors.

SUMMARY OF THE INVENTION

The present Invention has been developed to solve the foregoing problems, and it is an object of the present Invention to make it possible to inspect the pipe easily to determine whether the wall thickness is within the allowable range, regardless of the size of the pipe.

According to a first embodiment of the Invention, a light source is disposed at the center axis of the pipe, and at least one light receiver is disposed adjacent the outer circumference thereof, so that the light from the light source is received through the wall of the pipe thereby. A determination is made as to whether the wall thickness of the pipe is within allowable tolerances, based on the variation in the amount of light received by the light receiver. To examine the entire pipe, it is moved relative to the light receiving means so that substantially all of the pipe wall is presented to the light receiving means.

When the pipe wall thickness varies at any point on the pipe wall due (for example) to manufacturing error, the amount of light received from the light source through that point also varies. Therefore, if the amount of light received varies in excess of the allowable range, the thickness at such point is outside the predetermined tolerance; conversely, when the fluctuation of the amount of light received is within the range, the pipe wall thickness is also within that range.

In a second embodiment of the Invention, there is a plurality of the light receivers, each disposed at circumferential positions equidistant from the center axis. In another aspect of the Invention, the light receiver can rotate around the stationary pipe. Further, the pipe may be made by sequential extrusion blow molding of resin followed by extrusion of the resin in tubular form. Alternatively, pipe made by sequential extrusion blow molding of resin may be provided with continuous, inward, longitudinally extending notches in the pipe wall.

By providing a plurality of light receivers, it becomes possible to inspect the thickness of the pipe in a plurality of circumferential locations at the same time. By rotating the pipe, even a single light receiver can accomplish the same result. When the pipe formed by extrusion blow molding is inspected immediately after molding, and a notch is formed by a cutting blade, it is possible to use the blade holder as the holder for the light source. This locates the light source with great precision.

BRIEF DESCRIPTION OF THE DRAWINGS

In the accompanying drawings, constituting a part hereof, and in which like reference characters indicate like parts, FIG. 1 is a longitudinal cross section of the first embodiment of the present Invention;

DETAILED DESCRIPTION OF THE INVENTION

Figure 2:
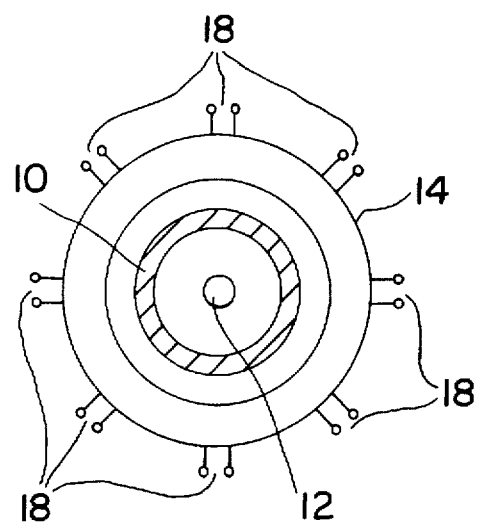
FIG. 2 is an elevation from the right side of FIG. 1.

The embodiment of FIGS. 1 and 2 is useful where the pipe is subjected to extrusion blow molding. Thermoplastic translucent synthetic resin 3 is supplied from a hopper (not shown) to extruder 1 and is caused to flow toward head 5 as shown by the solid line arrow in FIG. 1. Synthetic resin 3 is forced through the gap between dies 6 and point 7, and thereby is extruded in tubular form. The tube is cooled and solidified by cooler 9 located downstream of head 5, and forms pipe 10 of predetermined size.

On the rear of head 5, support 11 is affixed. Light source 12, preferably generating white light, is held by support 11 at the longitudinal axis of pipe 10 and at a point downstream of cooler 9. Surrounding pipe 10 at the point at which light source 12 is placed, is ring holder 14 with its axis concentric with that of pipe 10. A plurality (8 shown in FIG. 2) of light receivers are supported by holder 14, and the light from light source 12 is received through the wall of pipe 10 by each light receiver.

Figure 3:
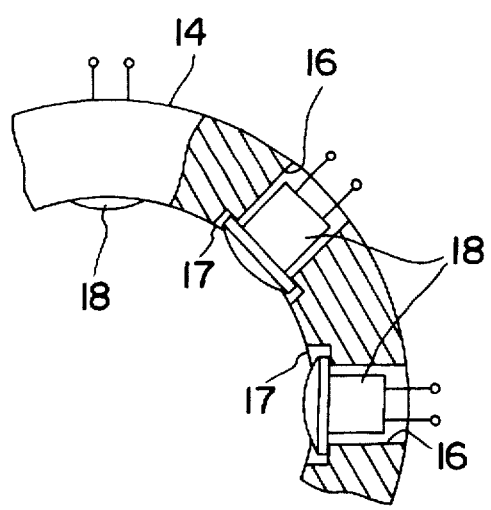
FIG. 3 is a fragmentary partial section of the holding ring of FIG. 1.

Retention of each light receiver 18 by holder 14 is shown in FIG. 3. A plurality of translucent radial holes 16 are circumferentially spaced apart, each being equidistant from its neighbors. At the radially inner end of each radial hole 16, there is formed mouth 17 of enlarged diameter and light receiver element 18 is retained therein. Light receivers 18 are located so that they are equidistant from the axis of pipe 10.

As can readily be understood, the amount of light transmitted through pipe 10, and hence the amount received by light receivers 18, will vary based on the thickness of the wall. The output of the processing circuit will correspondingly vary. Therefore, the processing circuit is adjusted so that a reference light amount, corresponding to the optimum desired wall thickness, is a predetermined value of, for example, 0. The acceptable light intensity variation is preset so that, when the wall thickness is outside the desired range, the defect will be noted and appropriate action taken. For example, the process parameters of the distance between dies 6 and point 7 can be adjusted to maintain the wall thickness within the desired range. Conversely, when the output level of the processing circuit proportionate to the amount of light received by each light receiver 18 is within the allowable range, the thickness of the pipe wall is known to be within the predetermined tolerances.

Figure 4:
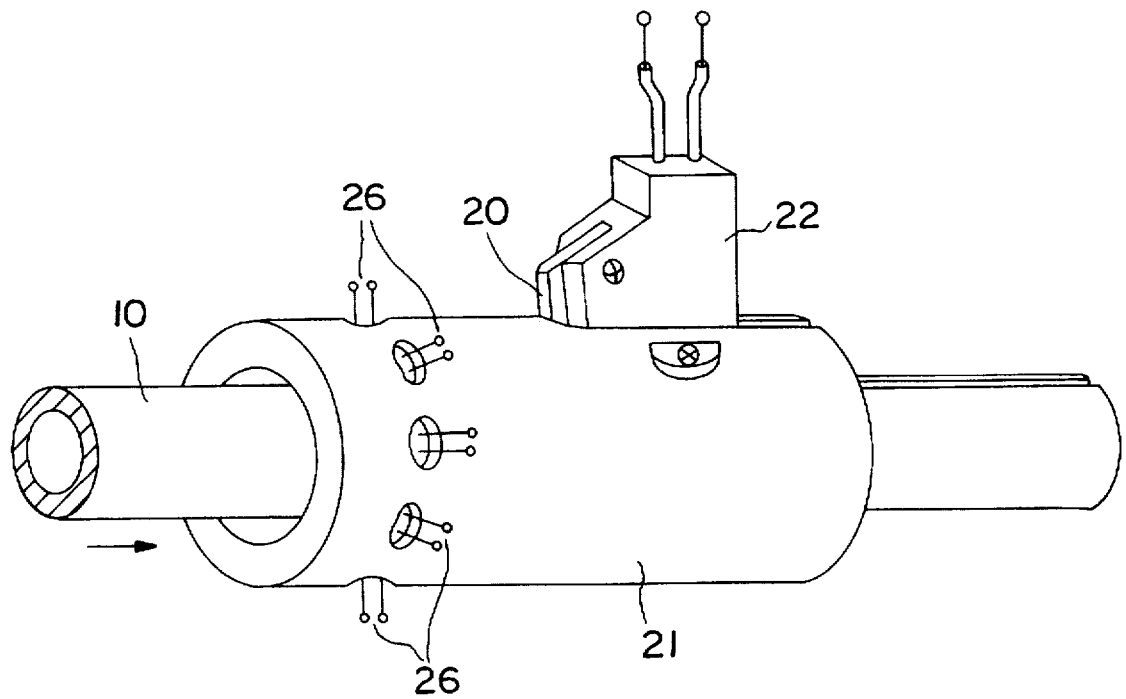
FIG. 4 is a perspective view of the second embodiment of the present Invention.

In another embodiment (see FIGS. 4 and 5), a notch is formed on the pipe wall by cutting blade 20 after pipe 10 is formed by extrusion blow molding. Pipe 10 is urged through the inside of cylindrical body 21 so that the axes of the pipe and body are concentric. Cutting blade 20 is held by blade holder 22 which is fixed to cylindrical body 21. At the upstream part of cylindrical body 21 (opposite the direction of the arrow), a plurality of radial translucent holes 24, spaced apart circumferentially, is located. At the radially inner end of each translucent hole 24, mouth 25, having an enlarged diameter, is formed to accommodate light receiver 26, so that it is not easily released. Light receivers 26 are held by cylindrical body 21 so that the distances from the center axis of pipe 20 to the light receiver surface of each light receiver 20 are equal.

Figure 5:
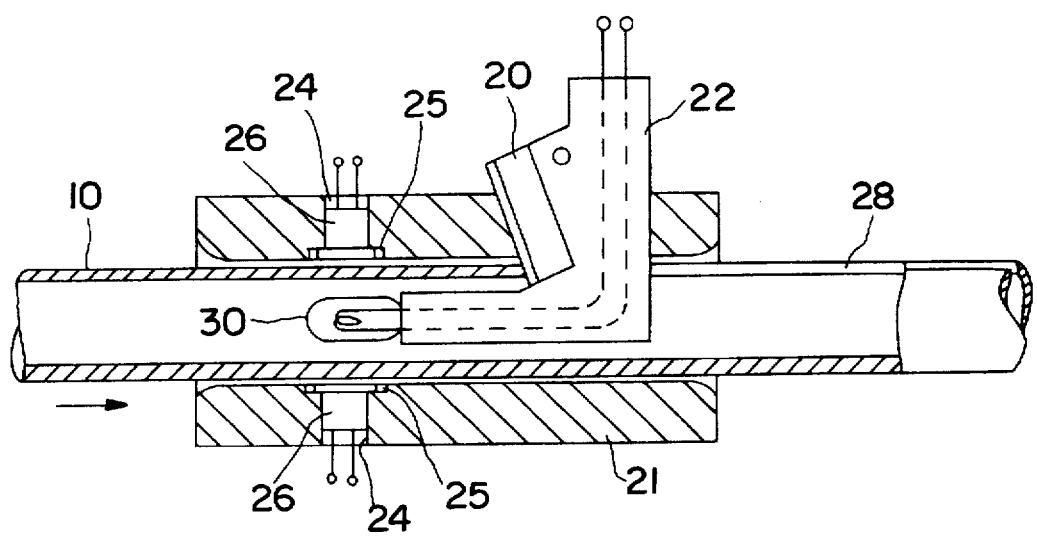
FIG. 5 is a view, similar to that of FIG. 1, of sectional view showing the embodiment of FIG. 4.

Blade holder 22 is formed in approximately an L shape as shown in FIG. 5, and the lower half thereof is inserted inside pipe 10 via notch 28 of narrow width formed in the wall thereof by cutting blade 20. At the upstream end of blade holder 22, light source 30 is supported. Light source 30 is at the longitudinal axis of pipe 10 and adjacent the light receiving faces of light receivers 26, so that the light generated passes through the pipe wall and impinges on the light receiving faces.

With this embodiment, it is, of course, possible to obtain the same result as with the first embodiment; moreover, light source 30 can be supported by blade holder 22, thereby obviating the need for a separate member to support the light source. This simplifies the construction and maintains light source 30 at the center of the pipe with great precision.

Figure 6:
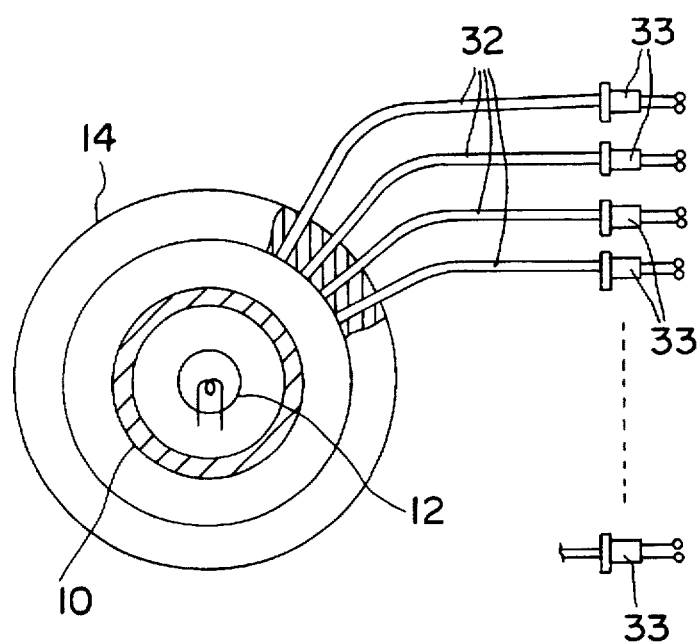
FIG. 6 is a front elevation, similar to that of FIG. 2, of the third embodiment of the present Invention.

A further embodiment is shown in FIG. 6. There are radial translucent holes for holding a plurality of optical fibers 32 on holder 14 as in the first embodiment. However, the end of each optical fiber 32 is inserted into the translucent hole, and light receiver 33 is disposed adjacent the other end of optical fiber 32. In this case, the translucent hole on holder 14 can be very small and still permit optical fiber 32 to be inserted therein; hence, it is possible to have a much larger number of optical fibers than can be accommodated by the first embodiment. This provides greater precision in determining the pipe wall thickness. Moreover, as it becomes possible to arrange various light receiving elements 33 collectively in a place distant from the pipe itself, the structure of the inspection apparatus is simplified and facilitation of maintenance and repair can be obtained.

In the foregoing specific descriptions, the pipe is formed by extrusion blow molding. However, as is apparent, the present Invention is similarly applicable to pipes obtained by any other procedure. In so doing, a single light receiver 18 may be used to receive light from the light source through the pipe wall. In this case, receiver 18 is rotated around the pipe, so that the entire surface area is tested. Conversely, light receiver 18 may be fixed and the pipe rotated. Furthermore, in each of the foregoing embodiments, the pipe has been moved axially, but the present Invention can be similarly practiced by moving the light receiver without moving the pipe.

Although only a limited number of specific embodiments of the present invention have been expressly disclosed, it is, nonetheless, to be broadly construed, and not to be limited except by the character of the claims appended hereto.

What we claim is:

1. A method of determining thickness of a wall of a pipe having a longitudinal axis comprising providing a source of generated radiation inside said pipe, at a location on said longitudinal axis, said wall being transparent to said generated radiation, at least one radiation receiver outside said pipe, at said location, and adjacent said source, whereby said generated radiation passes through said wall and is attenuated thereby to form received radiation which impinges on said receiver, said received radiation being less than said generated radiation by an amount inversely proportional to said thickness, and cutting at least one notch radially inwardly through said wall with a blade, said source being affixed to said blade and maintained at said location through said notch, and moving said wall, and said receiver and said source, relative to each other whereby said generated radiation passes through an area of said wall, and a device, connected to said receiver, generating a signal proportional to said received radiation.

2. The method of claim 1 wherein said generated radiation and said received radiation are visible light.

3. The method of claim 1 wherein there is a plurality of receivers circumferentially spaced around said pipe.

4. The method of claim 3 wherein each of said receivers is equally spaced from its adjacent receivers.

5. The method of claim 3 wherein each of said receivers is equidistant from said source.

6. The method of claim 1 wherein said receiver rotates about said longitudinal axis.

7. The method of claim 1 wherein said receiver moves parallel to said longitudinal axis.

8. The method of claim 6 wherein said receiver moves parallel to said longitudinal axis.

9. The method of claim 1 wherein said pipe moves in a downstream direction along said longitudinal axis.

10. The method of claim 1 wherein said area comprises substantially an entire surface of said wall.

11. The method of claim 1 comprising blow molding and extrusion of a resin to form said pipe.

12. The method of claim 1 wherein said receiver is a fiber cable, adapted to carry said received radiation, having a first end adjacent said location, outside said pipe, and adjacent said source, and a second end connected to said device.

13. An apparatus for determining thickness of a wall of a pipe having a longitudinal axis, said pipe being transparent to generated radiation, said apparatus comprising a source of said generated radiation positioned inside said pipe at a location on said longitudinal axis, at least one radiation receiver positioned outside said pipe, at said location, and adjacent said source, whereby said generated radiation passes through said wall and is attenuated thereby to form received radiation which impinges on said receiver, a cutting blade forming a radially inward notch through said wall, said source being affixed to said blade, thereby to maintain said source at said location, and said source and said receiver, and said wall being movable relative to each other, and a device, connected to said receiver, which generates a signal proportional to said received radiation.

14. The apparatus of claim 13 wherein said generated radiation and said received radiation are visible light.

15. The apparatus of claim 13 wherein there is a plurality of receivers circumferentially spaced apart around said pipe.

16. The apparatus of claim 15 wherein said receivers are spaced apart equally.

17. The apparatus of claim 13, comprising an extruder adapted to extrude a resin through a die to form said pipe.

18. The apparatus of claim 13 wherein said receiver is a fiber cable, adapted to carry said received radiation, having a first end adjacent said location, outside said pipe, and adjacent said source, and a second end connected to said device.

* * * * *